United States Patent Office
2,909,108
Patented Oct. 20, 1959

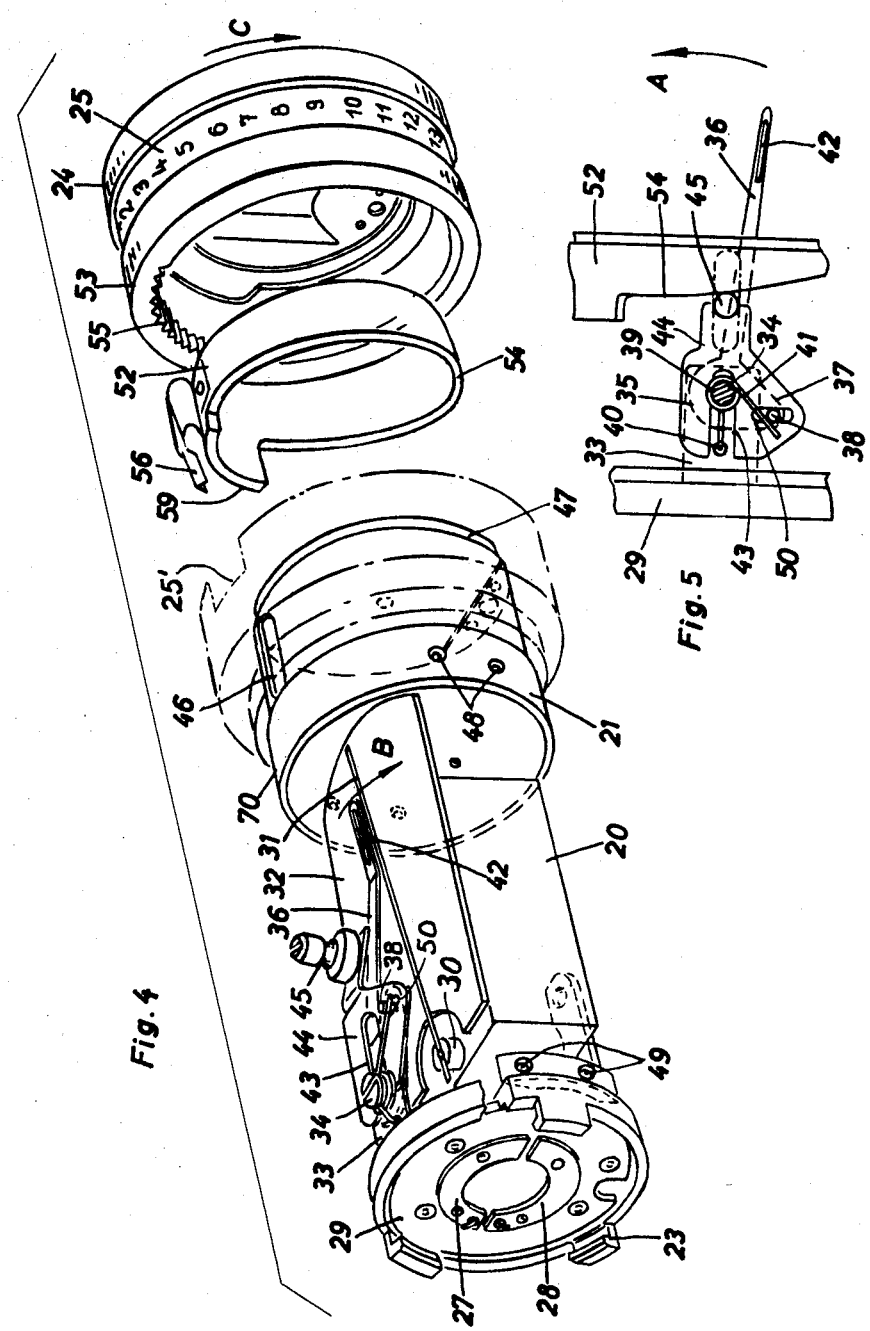

2,909,108

EXPOSURE METER ARRANGEMENT FOR PHOTOGRAPHIC CAMERAS

Karl Rander, Braunschweig, Germany, assignor to Franke & Heidecke Fabrik Photographischer Präzisions-Apparate, Braunschweig, Germany, a firm Application January 14, 1957, Serial No. 633,881

Claims priority, application Germany January 17, 1956

5 Claims. (Cl. 95—10)

This invention relates to an exposure meter arrangement for photographic cameras, particularly cameras of the twin lens reflex type, involving a picture taking chamber and a mirror reflex focusing chamber arranged above the picture taking chamber in the same unitary body.

An object of the invention is the provision of generally improved and more satisfactory exposure meter means for photographic cameras, particularly cameras of the type above mentioned.

Another object is the provision of an exposure meter arrangement particularly suitable for cameras where space is at a premium, and where there is insufficient room for building in an exposure meter in the customary locations.

Still another object is the provision of a twin lens reflex camera of the kind above mentioned, in combination with exposure meter means so arranged that the indications of the meter can be read easily while one is looking approximately vertically downwardly into the usual focusing hood at the top of the camera, without having to shift the camera to a different position in order to read the exposure meter.

A further object is the provision of exposure meter means so designed and constructed as to be easily removable from the camera for any necessary repairs or adjustments, and also designed that cameras may be furnished either with or without exposure meters, according to the wishes of the user, and the absence of the exposure meter, when not desired, will not result in awkward or unsightly vacant spaces in the camera.

These and other desirable objects may be attained in the manner disclosed as an illustrative embodiment of the invention in the following description and in the accompanying drawings forming a part hereof, in which:

Fig. 4 is an exploded perspective view of the exposure meter removed from the camera;

Fig. 5 is a plan of certain parts shown in Fig. 4; and

The same reference numerals throughout the several views indicate the same parts.

Figure 1:
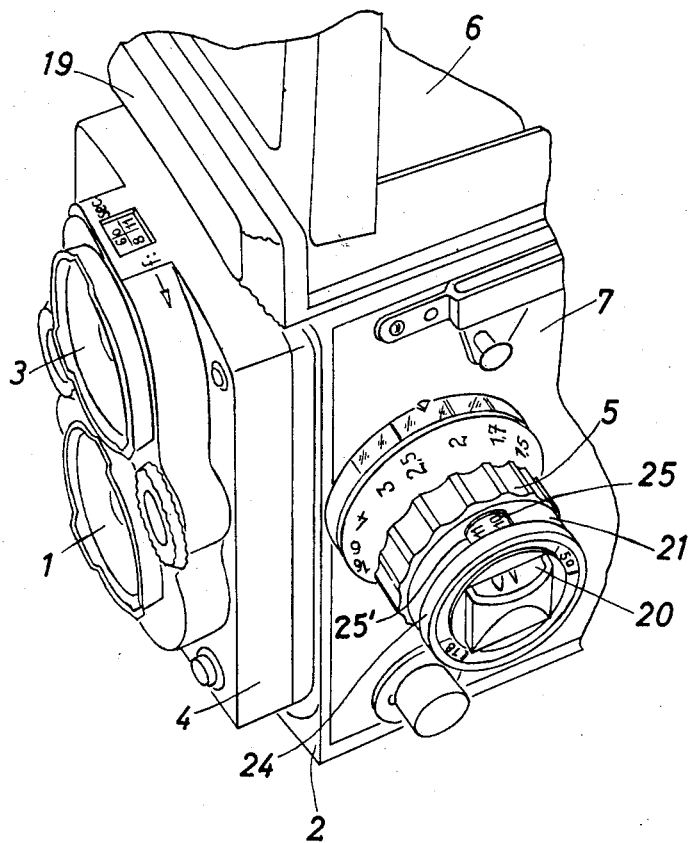
Fig. 1 is a fragmentary perspective view looking toward the front left upper corner of the camera body, illustrating a twin lens reflex camera equipped with an exposure meter arrangement in accordance with a preferred embodiment of the present invention.

By way of example, but not by way of limitation, the invention may be described in connection with a twin lens reflex camera which, except for the exposure meter arrangement herein disclosed, may be, for example, the well known camera manufactured by the firm of Franke & Heidecke, in Braunschweig, Germany, under the trademark "Rolleiflex" and widely known and used throughout the United States of America and elsewhere. The following description presupposes that the reader will have general familiarity with the construction of a "Rolleiflex" camera. It comprises a main camera body 2 of generally rectangular shape, having a movable front or lens carrier element 4 shiftable forwardly and backwardly in the direction of the optical axis for purposes of focusing, by means of a focusing knob 5 rotatably mounted on the left side wall 7 of the camera body. The camera front member or lens carrier supports a lower or picture taking lens 1 and an upper or finder lens 3, the image of the latter being reflected upwardly by the usual mirror arranged angularly within the finder chamber above the picture taking chamber, so that the image of the field of view of the camera appears on the horizontal ground glass plate or focusing screen 6 at the top of the camera. The usual folding hood, partially shown in Fig. 1, surrounds the focusing screen 6 in upstanding relation thereto in order to shade the focusing screen from direct light, while the camera is in use, and the focusing hood may be folded down to a collapsed position over the screen 6, when not in use.

Figure 2:
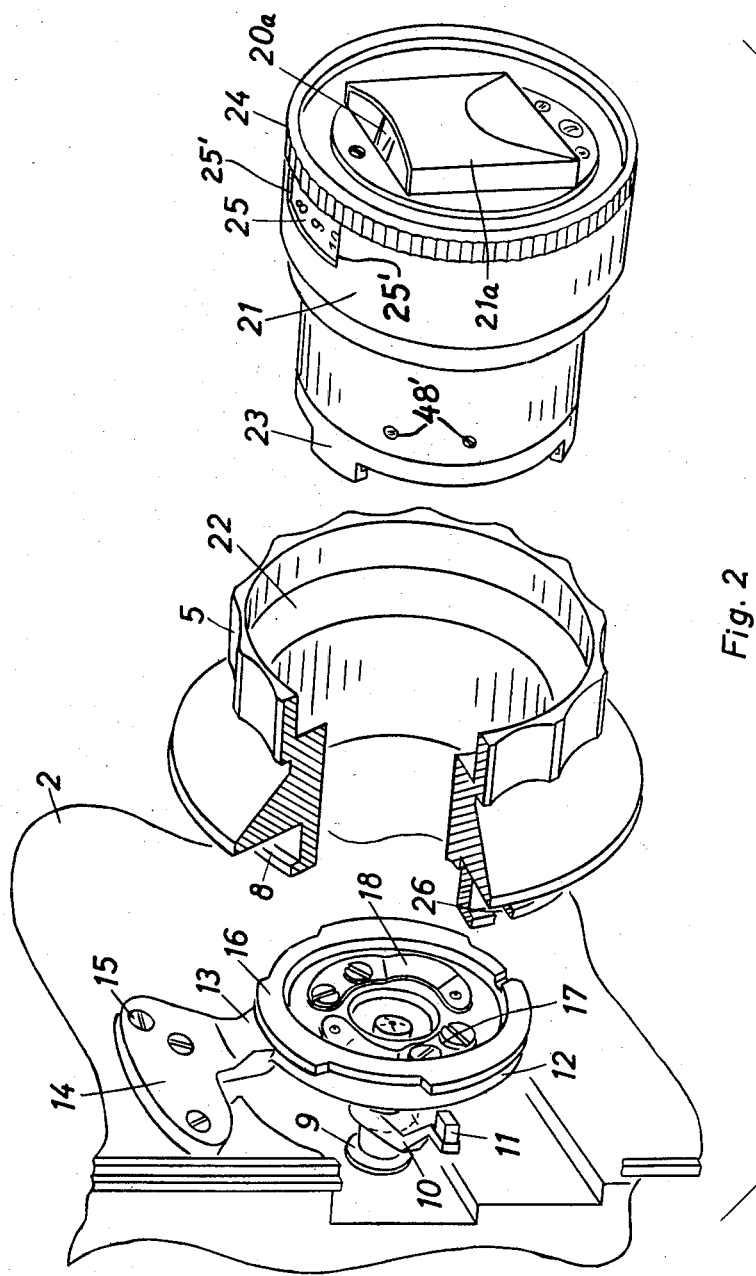
Fig. 2 is an exploded perspective view of the indicating portion of the exposure meter shown in Fig. 1, together with the focusing knob in which it is mounted and the connection means or mounting means for the focusing knob and the meter.
Figure 3:
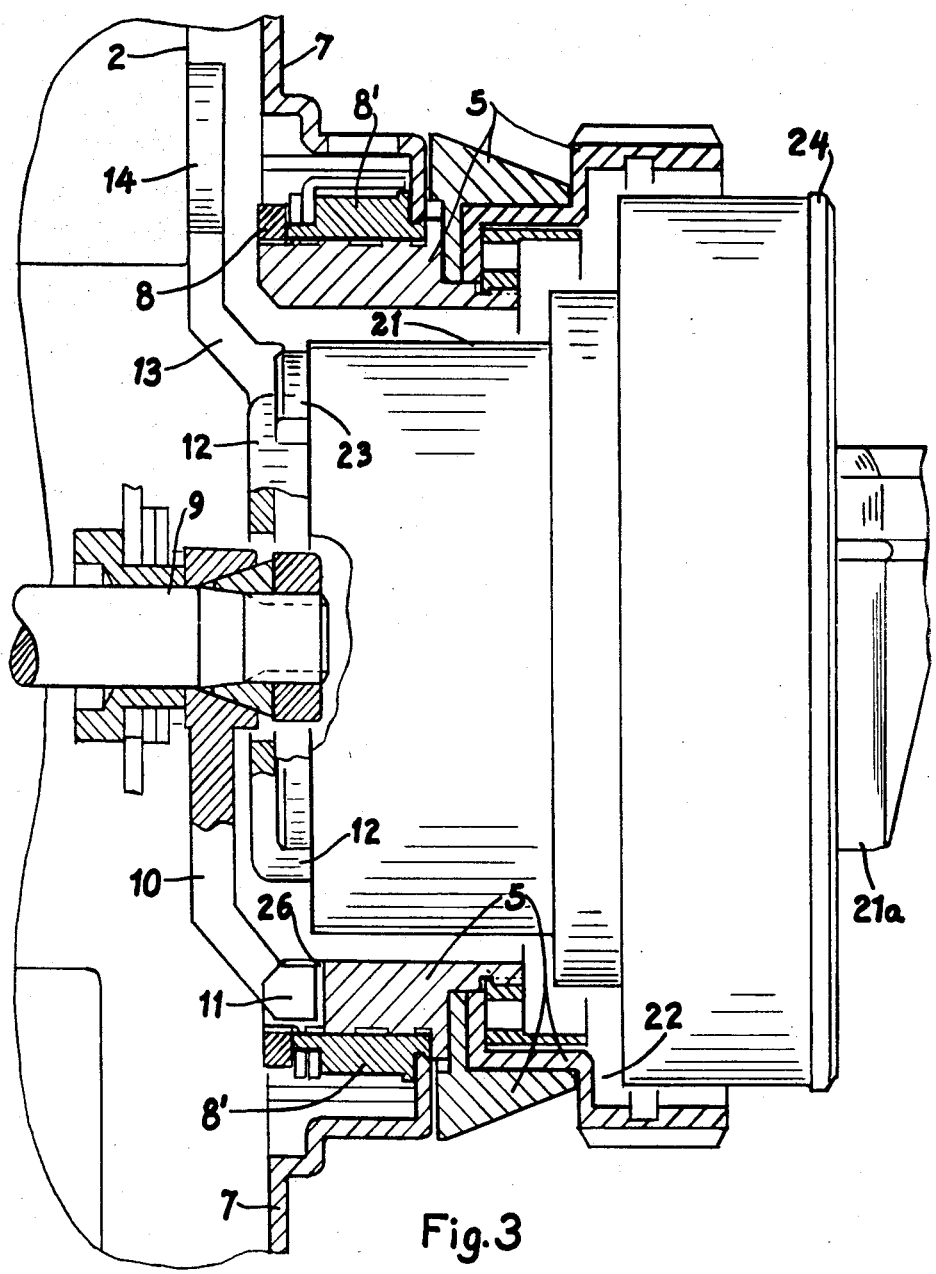
Fig. 3 is a diametrical section taken axially through the focusing knob and associated parts.
Figure 6:
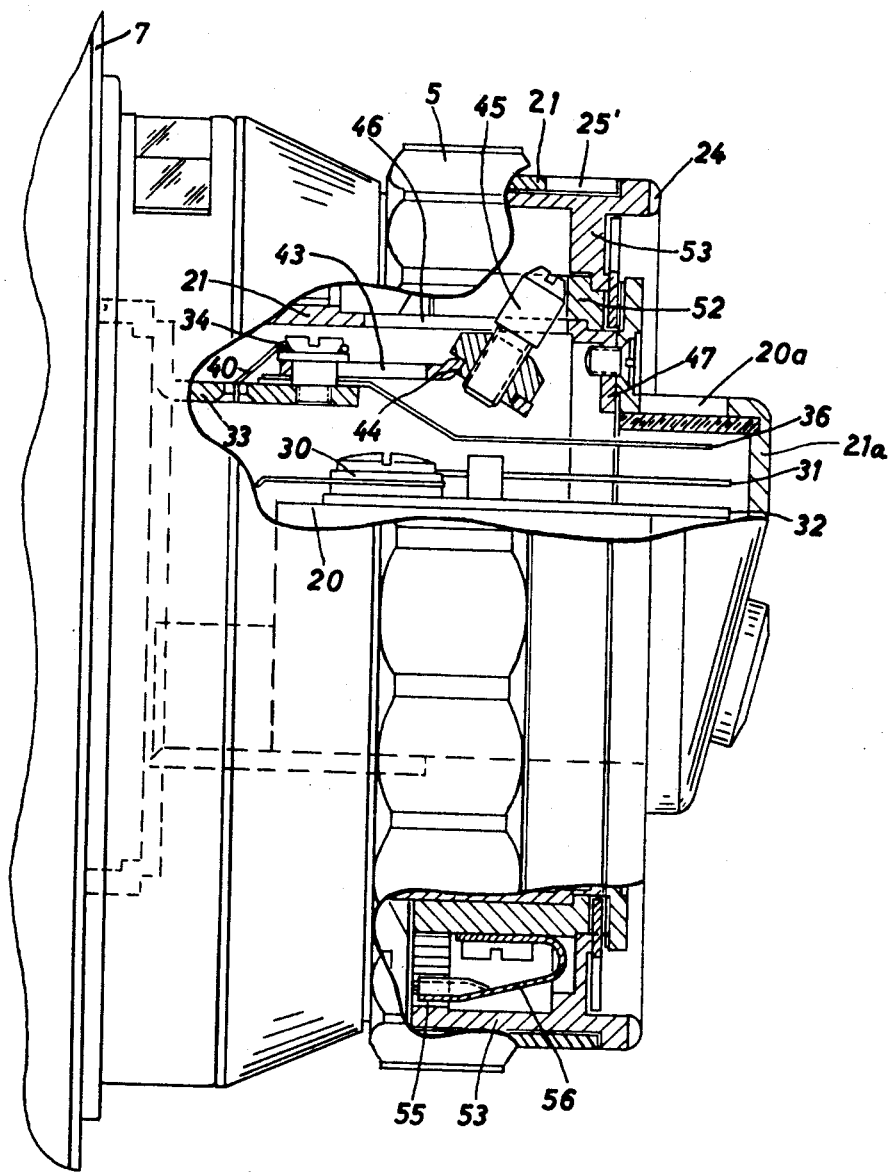
Fig. 6 is a side elevation of the exposure meter, with parts broken away and parts in vertical section, illustrating additional details.

Referring now to Figs. 2 and 3, the focusing knob 5 is of generally annular shape, and is hollow throughout its axial length. It is rotatably mounted and guided on the side of the camera by means of an annular flange 8 on the knob, which is received within a hollow bearing member 8' mounted on the outer casing or housing 7 of the camera. The focusing shaft 9, which extends in a direction crosswise of the optical axis of the camera and is alined axially with the axis of rotation of the knob 5, carries a crank arm 10 terminating in a driver portion 11 which extends out radially beyond a bayonet connection ring 12 and into a driving slot 26 formed in the knob 5 at the rear edge thereof.

The bayonet connection ring 12 is supported at only one point of its periphery by a web 13 connected to a flange 14 which is rigidly secured by screws 15 to the side wall 2 of the camera body, it being understood that this wall 2 is the main structural support at this side of the camera, whereas the previously mentioned wall 7 (on which the knob 5 is mounted) is an exterior housing or cover plate which covers the structural wall 2. As will be seen from the drawing, the web 13 is relatively small or narrow in a direction circumferentially of the ring 12, subtending only a very minor part of the complete circumference. As well understood by those familiar with "Rolleiflex" cameras, the focusing shaft 9 only needs to be turned somewhat less than one complete revolution, in order to shift the lens carrying front member 4 throughout its complete axial range of movement. The web 13 is designed as a stop to limit the rotation of the shaft 9, the full range of movement thereof being from a position in which the crank arm 10 engages one edge of the web 13, around through slightly less than one complete revolution until the crank arm 10 engages the opposite edge of the web 13.

The bayonet connection ring 12 carries a plurality of bayonet connection lugs 16 (preferably three of them) projecting radially outwardly as shown, in the manner of bayonet connections as commonly used for interchangeable lenses, filters, etc., on photographic cameras. Within the ring 12 there are two electrical contact springs 17 and 18 insulated from each other and from any metallic parts of the camera body. The photoelectric cell of the exposure meter is arranged on the camera body in some suitable place to receive light passing from the object to be photographed toward the camera, the photoelectric cell conveniently and preferably being placed as shown at 19, extending horizontally across the top of the front wall of the camera body, just above the movable front member 4, in the position heretofore occupied by the name plate in previous models of the "Rolleiflex" camera. The two electrical terminals of the photoelectric cell 19 are connected by suitable circuit wires (not shown) to the electric contact springs 17 and 18, respectively.

The indicating instrument itself, or actual meter part of the light meter, is contained in a barrel-shaped or cylindrical instrument housing 21 which fits within the bore extending through the focusing knob 5, the outer end portion of the instrument housing being of larger diameter than the inner end thereof, as shown, and there is a correspondingly enlarged part 22 of the bore through the focusing knob, to accommodate the larger part of the instrument housing.

The inner end of the instrument housing 21 is secured to the bayonet ring 23 having inwardly projecting bayonet claws which engage with the bayonet lugs 16 of the stationary ring 12, to hold the meter in normal mounted position within the focusing knob 5. The housing 21 is held to the bayonet ring 23, for example, by radial screws 48' (Fig. 2) which pass through holes 48 in the housing 21 and into tapped openings 49 in the ring 23.

At the front of the housing 21 there is a rotatable ring 24 having a bearing within the front portion of the housing 21 and rotatable about the axis of the housing. The front edge of this ring 24 is accessible at the front of the instrument, and is knurled for easy grasping and turning, to adjust the meter. The periphery of the ring 24 carries a suitably graduated scale 25, graduated for example in terms of light value or exposure value, for use, for example, with a correspondingly graduated shutter having a light value or exposure value scale such as shown, for instance, in French Patent 1,090,214, published March 29, 1955. The graduations of the scale 25 are read through a sight window 25' formed in the housing 21 near the top of the outer end thereof outwardly beyond the focusing knob 5, so that the meter scale may be observed through this window 25' while the photographer is holding the camera in the usual way at waist or chest level, and looking downwardly toward the focusing screen 6, without having to shift the position of the camera in order to read the meter scale.

Projecting axially at the outer end of the housing 21, outwardly beyond the end of the adjusting ring 24, is a housing extension 21a having a flat top surface provided with an observation window 20a through which are visible a meter needle or pointer 31, and a follower needle or pointer 36. Both of these needles swing horizontally on vertical pivots, so that here again the photographer may easily observe the positions of the respective pointers, through the window 20a, while looking downwardly in a general direction toward the focusing screen 6, holding the camera in picture-taking position at waist or chest level.

The pointer 31 is fixed to the upper end of the vertical shaft of a moving coil galvanometer of the kind customarily used in light meters, which is enclosed within the inner casing 20 mounted within the housing 21 and secured to the bayonet ring 23. The coil of the galvanometer is electrically connected to the contact segments 27 and 28 (Fig. 4) mounted on the base plate 29 of insulating material held within the bayonet ring 23, in such position that when the instrument is properly mounted within the focusing knob 5, the contact strips 27 and 28 press against the contact springs 17 and 18 on the camera body, so that the coil of the light meter will receive current from the photocell 19 mounted at the front of the camera body. Thus the position of the pointer 31 at any given instant depends upon the current output produced by the photocell 19.

The other pointer 36 is a follower pointer mounted on the vertical pivot 34 and constantly urged in one direction (a counterclockwise direction when viewed from above as in Fig. 5) by a light spring 39 coiled around the pivot 34, one end 40 of which is fixed to the stationary bracket 33, and the other end 41 of which acts on the pin 38 which is fixed to a lateral extension 37 of the needle 36 and which extends upwardly through a transverse slot 50 in a longitudinally slidable actuator 44 guided by a longitudinal slot 43 which embraces the pivot 34. An upwardly extending pin 45 at the forward end of the actuator slide 44 extends up through a guide slot 46 formed axially in the housing 21, so that the slide 44 can move only in an axial direction with respect to the housing 21 and the axis of rotation of the focusing knob 5.

The upper end of the pin 45 engages a cam surface 54 on a cam ring 52 rotatable about the axis of the instrument, which cam ring is received within and normally turns with the adjusting ring 24 previously mentioned, being coupled thereto with a resilient coupling. An axially extending flange 53 at the inner end of the adjusting ring 24 is provided with internal teeth 55 extending through at least a part of the periphery, which teeth are resiliently engaged by a spring 56 on the cam ring 52, so as to drive the cam ring rotationally from the adjusting ring 24. However, the cam ring has an axially extending lug 59 which engages with a fixed stop in the instrument housing to limit the rotation of the cam ring to slightly less than one complete revolution, whereas the rotation of the adjusting ring 24 is unlimited. Therefore, if the adjusting ring 24 is turned until the lug 59 of the cam ring comes against the fixed stop, and if the adjusting ring is then turned further beyond this point, the driving spring 56 will be caused to slip resiliently over the driving notches 55, whereby it is possible to change the orientation of the cam ring 52 with respect to the adjusting ring 24, to adjust the shutter for different film speeds, filter factors, or other variables.

Rotation of the cam ring causes the cam surface 54 to bear against the pin 45 of the slide 44, to move this slide axially, thereby swinging the pointer 36 on its pivot 34. Thus the adjusting ring 24 can be turned until the action of the cam 54, acting on the pin 45, serves to swing the pointer 36 to any desired position, the correct position being one in which it is alined directly over the meter pointer 31. To assist in obtaining accurate alinement of the two pointers, the follower pointer 36 preferably has its outer end formed with a slot 42, like the eye of a needle, through which slot the meter pointer 31 may be seen when the two pointers are accurately alined with each other.

In using the device, the cam ring 52 is first set in proper adjusted position with respect to the manual adjusting ring 24, in accordance with film speed and filter factor, if any. Then the camera is pointed to the scene to be photographed, so that the photocell 19 receives light from such scene, and the electric current produced by the photocell will cause the pointer 31 of the meter to assume a certain position. Then the operator turns the adjusting ring 24, readily accessible to his left hand (the same hand which normally turns the focusing knob 5) until the follower pointer 36 is brought into alinement with the meter needle 31. When these two pointers are in alinement with each other, which can be easily seen by looking downwardly through the window 20a, the operator then shifts his glance to the window 25' and observes the graduation of the scale 25 which is visible through this window. This graduation of the scale 25 indicates the proper light value setting for the shutter, and the operator then adjusts the shutter to the light value setting indicated by the meter assembly, and takes the picture.

All of this can be done very quickly because it is not necessary to change the position of the camera when performing the desired steps. As already indicated, the camera is held in the usual picture-taking position at chest level or waist level, with the operator looking downwardly toward the focusing screen 6 at the top of the camera. With simply a slight motion of his eyes, without moving the camera itself, the operator can readily see the relative positions of the two pointers 31 and 36 through the window 20a, and can readily see the resulting value indications given by the meter on the scale 25, through the window 25'.

The construction is particularly satisfactory from the standpoint of compactness, since most of the structure is built into the space within the focusing knob, which would otherwise be wasted. The meter structure projects only a slight distance axially beyond the end of the normal focusing knob, so presents no particularly space problem. In a camera of this kind, where practically all of the available space in or on the camera body is already occupied by various necessary parts or mechanisms, it is quite difficult to find additional space for mounting an exposure meter, and the present manner of mounting the exposure meter according to this invention represents a particularly satisfactory solution. Also, it does not interfere with carrying the camera and exposure meter in the customary carrying cases already available. Many of such carrying cases already have an opening in the left side wall of the case, through which the focusing knob projects when the camera is in the case. The camera equipped with an exposure meter according to the present invention can still be used in the same identical case previously used, because no external dimensions of the camera have been altered except the axial extent of the focusing knob assembly, and this does not interfere with placing the camera in the previously used carrying case because, as above stated, the carrying case has an opening through which the knob may pass.

If the meter requires adjustment or repair, it may easily be removed from the camera in just a moment by grasping it firmly and turning it on its axis in order to disconnect the cooperating bayonet connection parts 16, 23, and the meter unit after repair, or another duplicate meter unit, can be quickly reinstalled on the camera by a reverse movement. If the camera is to be offered to the public both with and without an exposure meter, the cameras offered without an exposure meter can be provided with a dummy barrel 21, having bayonet connections 23 to fit with the bayonet connections 16 on the camera body, but somewhat shorter than the present instrument housing 21 because the dummy need not project beyond the outer end of the focusing knob 5, serving merely to anchor the focusing knob in place. Thus no unsightly space is left if the purchaser decides to buy a camera without the exposure meter.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a camera body, a lens mounted for focusing movement relative to said body, a focus adjusting shaft mounted for rotation about an axis extending transverse to the optical axis of the lens and passing through a side wall of the camera body, a hollow focus adjusting knob rotatably mounted on and projecting laterally from said side wall in alinement with the axis of rotation of said shaft and operatively connected to said shaft, and a light meter unit detachably mounted in stationary position on said camera body side wall partially within said hollow knob and projecting laterally beyond the outer end of said knob, the projecting outer end of said meter unit including a movable pointer positioned to be visible when viewed in a direction downwardly toward the axis of rotation of said focusing knob from a position above said focusing knob.

2. A construction as defined in claim 1, in which said movable pointer swings approximately horizontally on an approximately vertical axis when the camera body is held in normal upright position.

3. A construction as defined in claim 1, in which the detachable connection between said camera body and said meter unit includes a bayonet lug ring alined with said focus adjusting shaft and secured stationarily to said camera body by a web subtending only a minor part of the circumference of said ring, and in which said web serves as an abutment limiting the maximum extent of rotation of said focus adjusting shaft.

4. A construction as defined in claim 1, in which said meter unit is in an approximately cylindrical unit coaxial with said knob.

5. A construction as defined in claim 4, in which said meter unit includes a meter setting member rotating coaxially with said knob.

References Cited in the file of this patent

UNITED STATES PATENTS

| | | |
|---|---|---|
| 2,241,017 | Kuppenbender | May 6, 1941 |
| 2,250,898 | Tonnies | July 29, 1941 |
| 2,343,206 | Rath | Feb. 29, 1944 |
| 2,387,466 | Rath | Oct. 23, 1945 |

FOREIGN PATENTS

| | | |
|---|---|---|
| 483,654 | Great Britain | Apr. 22, 1938 |
| 878,104 | France | Sept. 28, 1942 |